United States Patent

Volenec

[11] 3,885,340
[45] May 27, 1975

[54] FISHING LURE

[76] Inventor: Donald C. Volenec, 4533 S. 39th St., Omaha, Nebr. 68107

[22] Filed: Nov. 5, 1973

[21] Appl. No.: 413,033

[52] U.S. Cl. .............. 43/42.16; 43/42.21; 43/42.33
[51] Int. Cl. ............................................. A01k 85/00
[58] Field of Search............ 43/42.33, 42.16, 42.21; 161/18

[56] References Cited
UNITED STATES PATENTS

| | | | |
|---|---|---|---|
| 1,451,436 | 4/1923 | Barnia | 43/42.21 |
| 2,435,612 | 2/1948 | Snyder | 161/18 |
| 2,909,863 | 10/1959 | Rector et al. | 43/42.33 X |
| 3,505,754 | 4/1970 | Lawlor | 43/42.33 X |

FOREIGN PATENTS OR APPLICATIONS 722,798   1/1932   France .................. 43/42.16

Primary Examiner—Louis G. Mancene
Assistant Examiner—Daniel J. Leach
Attorney, Agent, or Firm—Hiram A. Sturges

[57] ABSTRACT

A fishing lure comprising a hollow body portion containing a fluid in which shiny particles move about, the fluid being agitated by motions of the body portion resultant from water interaction with its exterior and from motion of a weight inside the lure, the body being closed.

10 Claims, 10 Drawing Figures

PATENTED MAY 27 1975 3,885,340

FISHING LURE

FIELD OF THE INVENTION

This invention is in the field of fishing lures such as casting and trolling lures of various kinds.

DESCRIPTION OF THE PRIOR ART

The prior art has never had a fishing lure provided with tiny particles of a very shiny nature moving about in a fluid held inside a closed body portion of a lure.

Shiny particles are excellent for attracting fish, in my opinion. Shiny particles have never before been proposed for moving in a fluid in a lure. Shing metallic particles are particularly effective and can be very many in number.

One of the older patents uses the motion of an air bubble in a fluid in its exterior for attracting fish. However, solid or metallic particles which are bright and highly light reflecting would be, in my opinion, much more effective than an air bubble, since air bubbles exist in water areas naturally and it would be the experience of fish that they are not edible.

Some prior art proposals have included bodies through which water flows. That is, the water in which the lure is moving through flows directly through the body of the lure in some prior art proposals. However, it is my opinion, that the interior of a plastic lure which has the water of a river, lake, or stream flowing through it, would soon become clouded and would be impossible to clean or else cleaning it would be a nuisance.

In some prior art proposals, floating objects are proposed for floating in a body. In my opinion, floating objects are less desirable because they would tend to remain at the top of the liquid in the lure, rather than floating all about in the lure.

A particular object of my invention is to provide a weight or ball of greater specific gravity than the fluid inside the lure and adapted to roll around as the lure is moved, whereby its rolling has the effect of agitating the particles within the lure, which latter are of a greater specific gravity than water so that they will not tend to float at the top of the inside of the body where it would be difficult for the agitating weight ball to strike them and keep them moving.

I prefer that the particles be of the same, or nearly the same, specific gravity as the fluid in which they float so as to shift about without excessively sinking or floating.

A particular object of my invention is to provide the body with exterior vane means causing it to move laterally of itself as a result of water striking the vane means while the lure is moved forwardly through the water, the latter movement of the body being adapted to increase agitation of the fluid and of the particles, the vane means being either connected to a body that forms substantially the entire main part of the lure, or else being connected to a body that forms a rotating part of a lure that has forward and rearward portions supporting hooks.

SUMMARY OF THE INVENTION

A fishing lure is disclosed comprising a closed hollow body portion containing fluid and containing shiny particles, hook means attached to the body, the body having fishing line attachment means thereon, the closed nature of the body preventing discoloration of the interior of the body.

The combination is described in which a weight is disposed in the fluid of a greater specific gravity than the fluid so that when said body is caused to move in any movements other than smoothly forward, then said weight will shift with respect to said body for stirring up said particles, the weight being a heavy ball.

The particles are of shiny metal or of other material having a specific gravity of at least as great as the fluid so as not to float therein.

The body has vane means on the exterior thereof for deflecting water during forward movement of the lure in a manner for causing the body to define lateral movements sufficient to agitate the fluid.

The vane means specifically comprises a plurality of vanes which are disposed on a rotating central body portion which contains said fluid and said particles and which are disposed between forward and rearward body portions and rotate with respect thereto.

DESCRIPTION OF THE PREFERRED EMBODIMENT

Figure 1:
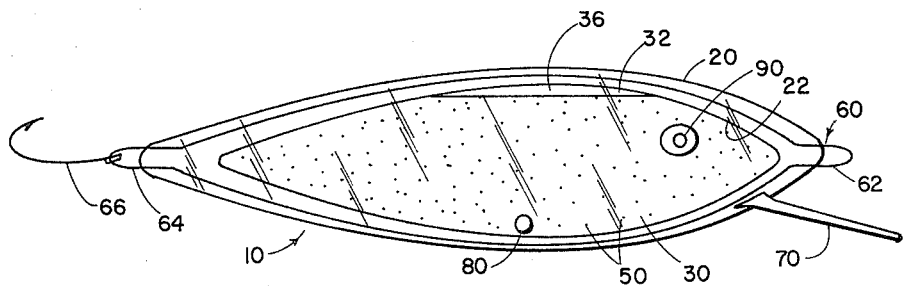
FIG. 1 is a side elevation of a fishing lure of this invention shown with its transparent body portion and with particles and an agitator weight moving about therein.
Figure 2:
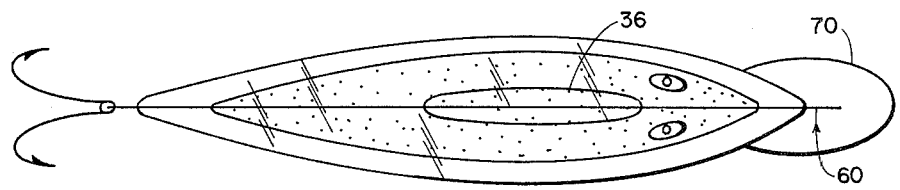
FIG. 2 is a top plan view of the lure of FIG. 1.

The fishing lure of this invention in its preferred form is generally indicated at 10 in FIG. 1, and comprises a closed hollow body 20, having an inner wall 22 within which a fluid 30 is disposed.

The fluid 30 preferably incompletely fills the interior of the body 20, as indicated by the upper level of the fluid, seen at 32, so that the presence of an air bubble at 36 permits the fluid to move about more freely than would otherwise be possible.

The fluid 30 is preferably of a sort that would not freeze under normal conditions to which the product would be exposed. For example, it could be radiator fluid, such as used in automobiles, but preferably nontoxic clear mineral oil.

The body 20 is preferably transparent and at the least translucent, but is preferably as clear as possible, so that metallic particles 50 moving about in the fluid can be easily seen by a fish as they catch the light and glitter.

The plurality of particles 50 are many in number such as from 10 to an almost unaccountable quantity, and the particles 50 are preferably of a specific gravity at least as great as that of the fluid itself, and therefore, will not float at the top of the fluid.

The body 10 has a securing wire assembly, generally indicated at 60, embedded in it, and providing a fishing line attachment loop 62 at the forward end of the body and a hook attachment loop 64 at the rearward end of the body, to which a hook 66 is secured.

The body 20 can be provided with a lip 70, if desired.

Inside the hollow body is a rolling weight ball 80 of a greater specific gravity than the fluid 30, so that movements of the body, which are other than smoothly straight forward in the water, will tend to cause the weight 80 to roll about and stir up the particles 50 to prevent them from remaining settled on the bottom.

The body can be provided with eyes 90 painted thereon, if desired.

The particles 50 need not be round, and can be flat on each of two sides.

Figure 3:
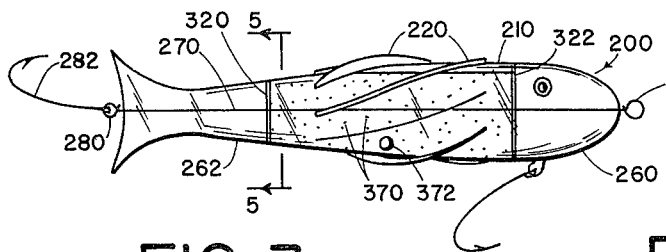
FIG. 3 is a side elevation of a modified lure of this invention which has a rotating central body portion.

In FIG. 3, a modification of the invention is shown, in which a fishing lure is there shown at 200 and has a hollow body portion 210 having a plurality of vanes 220 on its exterior, causing it to rotate with respect to head and tail portions 260 and 262, which latter are stationary with respect to each other and are held together by a longitudinally extending securing member 270.

The securing member 270 is permanently anchored in the head portion 260 and the tail portion 262, and is attached at its forward end to a loop 272 for attachment of a line, and extends rearwardly from the tail portion 262 to a hook attachment loop 280, to which a hook assembly 282 is secured.

Figures 4, 5:
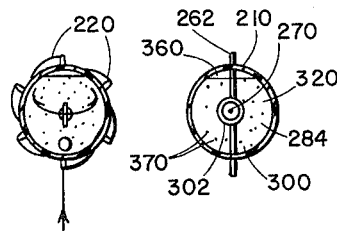
FIG. 4 is a frontal elevation of the lure of the modification of FIG. 3.
FIG. 5 is a sectional view taken along the line 5—5 of FIG. 3, but showing a cross-section of the body portion of the lure only for illustrating the annular fluid chamber therein, a central axle wire of the lure being shown.

A portion of the member 270 extends through the hollow body portion 210 and forms an axle for the body portion 210, since the body portion 210 has an annular chamber 284 when seen in cross section in FIG. 5, so that fluid 300 does not leak out since an inner wall of the body portion 210 is rotatably disposed around and receives the member 270 like it was an axle. The inner wall 302 is firmly connected to forward and rearward walls of the central body portion 210, the forward and rearward walls being seen at 320 and 322 in FIG. 3. Because the entire body member 210 is transparent, portions of the tail 262 can be seen in FIG. 5, through the rear wall 320 of the body portion 210.

The fluid 300 in the body portion 210 does not completely fill its interior, so that an air bubble 360 exists for the same purpose as the bubble in FIG. 1.

Metallic particles or particles of another nature, but described as the particles 50 of the modification in FIG. 1, are seen at 370 in FIG. 3, and an agitating weight ball 372 of identical description to the weight ball 80 is also used in the interior of the main body portion or central portion 210 of the modification of FIGS. 3 to 5.

In operation the vanes 220 will cause the central body portion 210 to rotate, so as to keep the metallic particles distributed and flashing, especially with the assistance of the weight ball 372.

Figure 6:
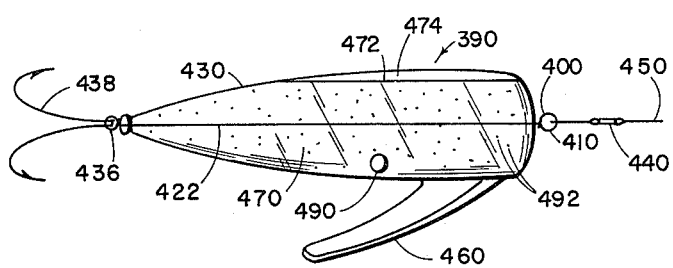
FIG. 6 is a side elevation of a second modification of the lure of this invention in which the entire lure spins because of a vane attached to it.
Figure 7:
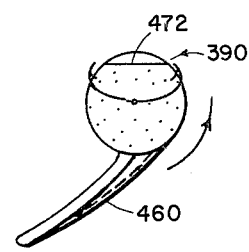
FIG. 7 is a frontal elevation of the lure of FIG. 6.

In FIG. 6, a third modification of the invention is there shown, in which a central attachment assembly, generally indicated at 400, is made from a single piece of wire, having a loop 410 at its forward end, to which a line can be attached, the attachment assembly 400 having an elongated portion 422 extending longitudinally through the body portion 430 of the lure 390 of FIG. 6, and having a loop 463 at its rearward end to which a hook assembly 438 is attached.

In a modification of FIG. 6, the entire body 430 rotates simultaneously with the attachment assembly 400, which makes construction less costly, but does require a swivel 440 to be used in the line 450 attached to the loop 410, so as to prevent the line from unduly twisting, since the body portion 430 rotates continually because of the vane 460 protruding therefrom. The latter has a shape such that when the lure 390 is moved through the water by being pulled at its loop 410, the vane 460 will cause the body portion 430 to rotate in a manner for agitating the fluid therein, which latter is seen at 470, having an upper surface 472 disposed below the top of the interior of the body 430, for providing an air bubble 474 to make agitation of the fluid easier. Such agitation during rotation is very good, and further helped by a weight ball 490 of the description of the weight ball 80 of FIG. 1, and which agitates the fluid, and thereby agitates the shiny particles or other kind of particles 492 therein, which latter are of the same description of particles 30 of FIG. 1.

Figure 8:
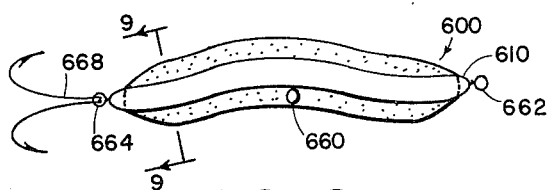
FIG. 8 is a side elevation of a further lure modification of this invention.
Figure 9:
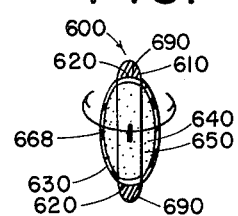
FIG. 9 is a sectional view taken along the line 9—9 of FIG. 8 and showing how the lure of FIG. 8 is composed of a metallic main portion and a removable transparent pod portion, which latter contains fluid and particles.
Figure 10:
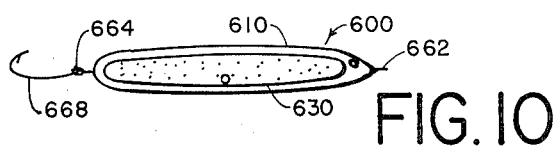
FIG. 10 shows the modification OF FIG. 8 as it would be seen from the bottom of FIG. 8 or in side elevation.

Referring now to FIGS. 8–10, a fourth modification of the invention is there generally indicated at 600, and it comprises a central portion 610, which is formed of plastic material and which has a wavy look from the top plan view, for giving it special motion in water, as seen in FIG. 8.

The portion 610 is provided with an opening 620 in its central portion, as seen in FIG. 9, the opening 620 being elongated in a forward to rearward direction for receiving an elongated hollow pod 630, which is formed of translucent material and which is hollow and closed for retaining therein fluid 640, the fluid 640 and particles 650, and even the weight ball 660 therein all being of like description to their counterparts in FIG. 1 modification.

The portion 610 has a loop 662 at its forward end for the attachment of a line, and a loop 664 at its rearward end to which a hook assembly 668 is attached. The modification of FIGS. 8 and 9 can be considered to be a modification of a spoon-type of lure, and its interior fluid can be the same as the modification of FIG. 1. Its pod is removable and interchangeable, so that a pod having particles generally of one color can be interchanged with a like pod having particles of a different color.

This interchangeability is accomplished by simply pressing on the pod and pushing it out from its opening in the member 610, although the pod will be held in the member 610 securely enough, except when such pressure is exerted, because the pod is arcuate at its top and bottom, fitting in an arcuate wall 690 seen in FIG. 9, and which extends completely around the opening in the member 610 that the pod is received in.

If desired, the holding part 610 of the modification of FIGS. 8 and 9 can be made of metal, even though the pod itself is plastic, meaning thermoplastic material of a nature and resiliency such that it will yield as it is pressed into the opening 620, and then will regain its shape so that convex portions of its exterior which are adjacent the concave wall of the opening 620 will be in parallelism and abutting relationship therewith.

FIG. 10 shows the lure of FIG. 8 as seen in side elevation.

The particles 50, 370 and 470 of the several modifications can also be beads of a round or semi-round nature, although the inexpensive metallic particles which are shiny and have substantially flat sides are effective in their flashing and attention-getting.

The term "shiny" as used herein, means not so dull as not to be substantially light reflective, and the term "shiny" would include the amount of shininess one sees on a smooth object of thermoplastic material. The word "shiny," as I use it, does not necessarily mean the amount of shininess of smooth metallic particles or smooth chromium plating although all of these are "shiny" as I use that term.

I claim:

1. A fishing lure comprising a closed hollow body, a fluid in said hollow body, a plurality of particles in said fluid so that when said fluid moves such movement causes said particles to move, said particles being of a highly light-reflective nature, hook means attached to said body, said body having a fishing line attachment means on the exterior thereof.

2. The fishing lure of claim 1 comprising a weight in said fluid of a higher specific gravity than said fluid so that when said body is caused to move in any movement other than smoothly forward said weight will shift with respect to said body for stirring up said particles.

3. The fishing lure of claim 1 comprising a weight in said fluid of a higher specific gravity than said fluid so that when said body is caused to move in any movement other than smoothly forward said weight will shift with respect to said body for stirring up said particles, said particles being of a specific gravity at least as great as that of said fluid.

4. The fishing lure of claim 1 comprising said body having means on the exterior thereof engaging and deflecting water during forward movement of said lure in a manner for causing said body to define lateral movements sufficient to agitate the fluid in said lure.

5. The fishing lure of claim 1 comprising spaced head and tail portions, means connecting said head and tail portions together, said hollow body portion being rotatably mounted on said connecting means between said head and tail portions, said hollow body portion having vane means on its exterior causing it to rotate with respect to said head and tail portions when water flows past said vane means.

6. The lure of claim 1 in which said particles are shiny pieces of metal.

7. The lure of claim 5 in which said particles are shiny pieces of metal.

8. The lure of claim 2 in which said particles are shiny pieces of metal.

9. The fishing lure of claim 1 further comprising a retainer surrounding said body, said retainer having an opening therein receiving said body, the wall of said retainer opening and the exterior of said body being cooperatively interfitted and said body being sufficiently resilient that said body can be removed from said retainer opening by firmly pressing manually on said body yet said body is held in said frame during operation by said interfitting with said retainer portion.

10. The fishing lure of claim 1 in which said particles are at least ten in number.

* * * * *